Dec. 31, 1957 G. C. SZIKLAI 2,818,464

SIGNAL TRANSLATING APPARATUS

Filed Aug. 28, 1952 2 Sheets-Sheet 1

INVENTOR.
George C. Sziklai

BY Charles H. Brown

ATTORNEY

INVENTOR.
George C. Sziklai
BY Charles H. Brown
ATTORNEY

United States Patent Office 2,818,464

Patented Dec. 31, 1957

2,818,464

SIGNAL TRANSLATING APPARATUS

George C. Sziklai, Princeton, N. J., assignor to Radio Corporation of America, a corporation of Delaware Application August 28, 1952, Serial No. 306,783

12 Claims. (Cl. 178—6.6)

Figure 1:
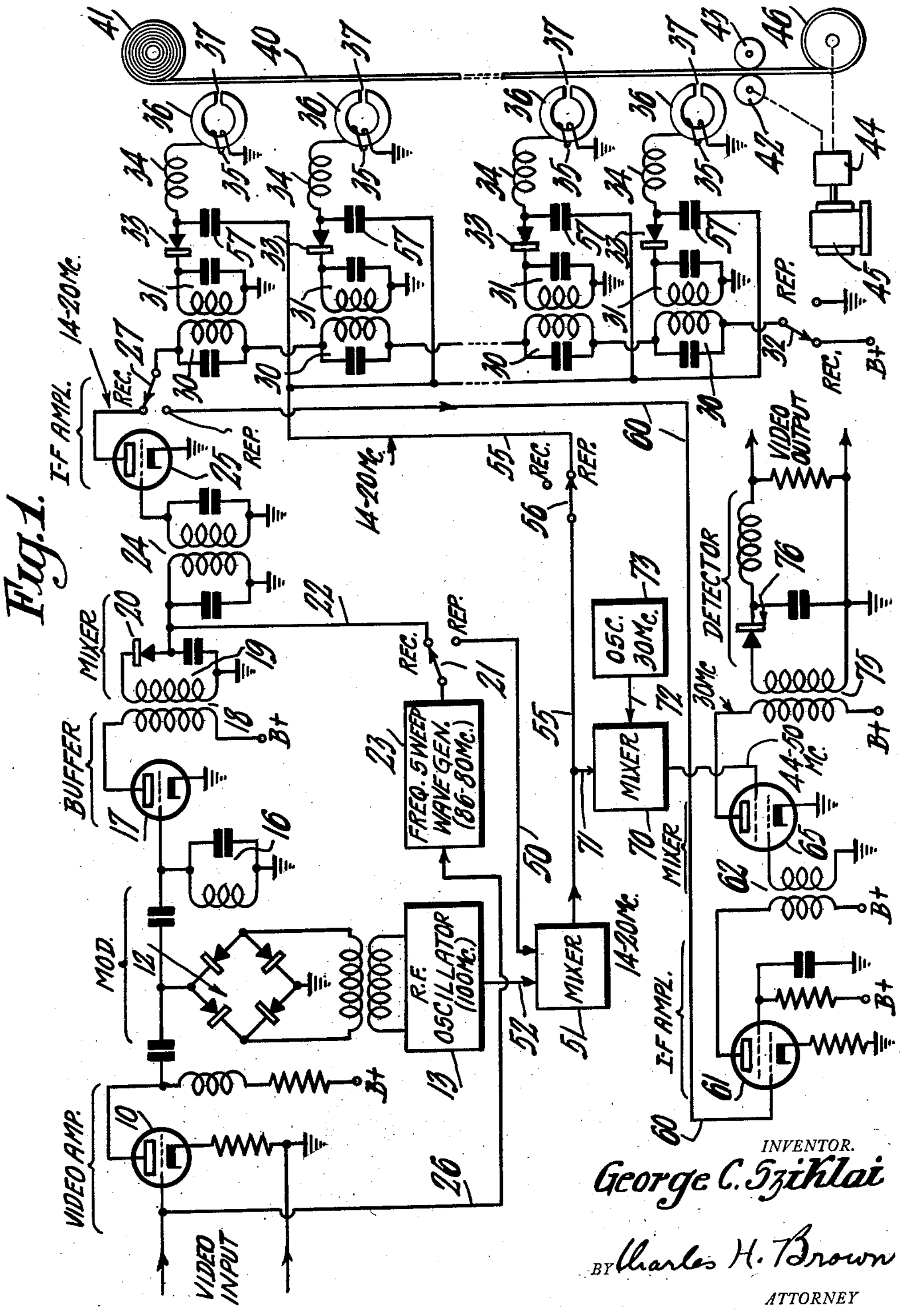

This invention relates to signal translating apparatus, and more particularly, but not exclusively, to novel apparatus for magnetically recording and reproducing image signals representing a picture or image, such as the signals employed in television.

The recording of a broadcast television program in some form is often desirable. It is conventional practice to obtain such a record by photographing an image produced under control of a video signal generated for broadcast purposes. The film record so obtained is also available as a source of image signals for rebroadcast purposes. Direct motion picture photography of a performance designed for television entertainment is also used to obtain a motion picture film record of the performance. This film record can be cut and edited prior to its use as a program item in a television broadcast. The presently practical methods outlined above depend upon the use of photographic film which is relatively expensive and which requires expensive processing. Moreover, processing must be carried out in dark rooms or light-proofed containers with the aid of chemicals and chemical handling equipment.

In accordance with the present invention, television program records and also records to be edited for a television performance are obtained by novel magnetic recording methods and apparatus. The methods of magnetic recording of image signals generated by television scanning equipment suggested by the prior art have had a serious limitation imposed by reason of the impracticability of moving a recording magnetic medium at a velocity which is sufficiently high properly to record the image signals in a form available for satisfactory reproduction. In accordance with the present invention, novel arrangements are provided whereby the recording medium is moved at a speed practical for both recording and reproducing. This is accomplished in one form of the invention by employing means for apportioning the recording effects over an extended area of the recording medium rather than along a single line. The linear velocity of the recording medium may, therefore, be kept desirably low. Preferably, a recording medium of given area is used, having an appreciable length and a width which is convenient for handling and storage. In accordance with the invention it is possible to use a plurality of strands or wires for magnetic recording purposes although this is not preferred. The area spoken of will then be a geometrical abstraction as it is represented by the total number of wires and their spacing.

The invention has for its principal aim to provide novel signal translating means.

Another object is to provide improved means for magnetically recording and reproducing image signals.

A further object is to provide novel image signal recording and reproducing means which may be constructed with standard components.

In one aspect, the invention comprises means for amplitude modulating a carrier wave with the video or image signal, the carrier wave being one sweeping in frequency in sawtooth fashion with the period of the sawtooth equal to the period of one horizontal line of the image signal. The frequency of the carrier wave is thus made directly proportional to time along horizontal lines of the image signal. The amplitude and frequency modulated wave is coupled to a plurality of circuits each tuned to a different frequency of the carrier wave and each coupled to one of a plurality of recording heads arranged over a moving magnetically-sensitive recording web. There may be three hundred recording circuits and heads depending on the degree of horizontal resolution desired and each recording circuit and head may be capable of handling frequencies in a band about fifteen kilocycles wide. In reproducing the image signal, the web with the magnetically recorded information thereon is passed under the heads and the outputs therefrom are combined to form the image signal.

In another aspect the invention comprises signal translating apparatus for the translation of a single wide-band signal to a plurality of narrow-band signals, and vice versa.

Figure 2:
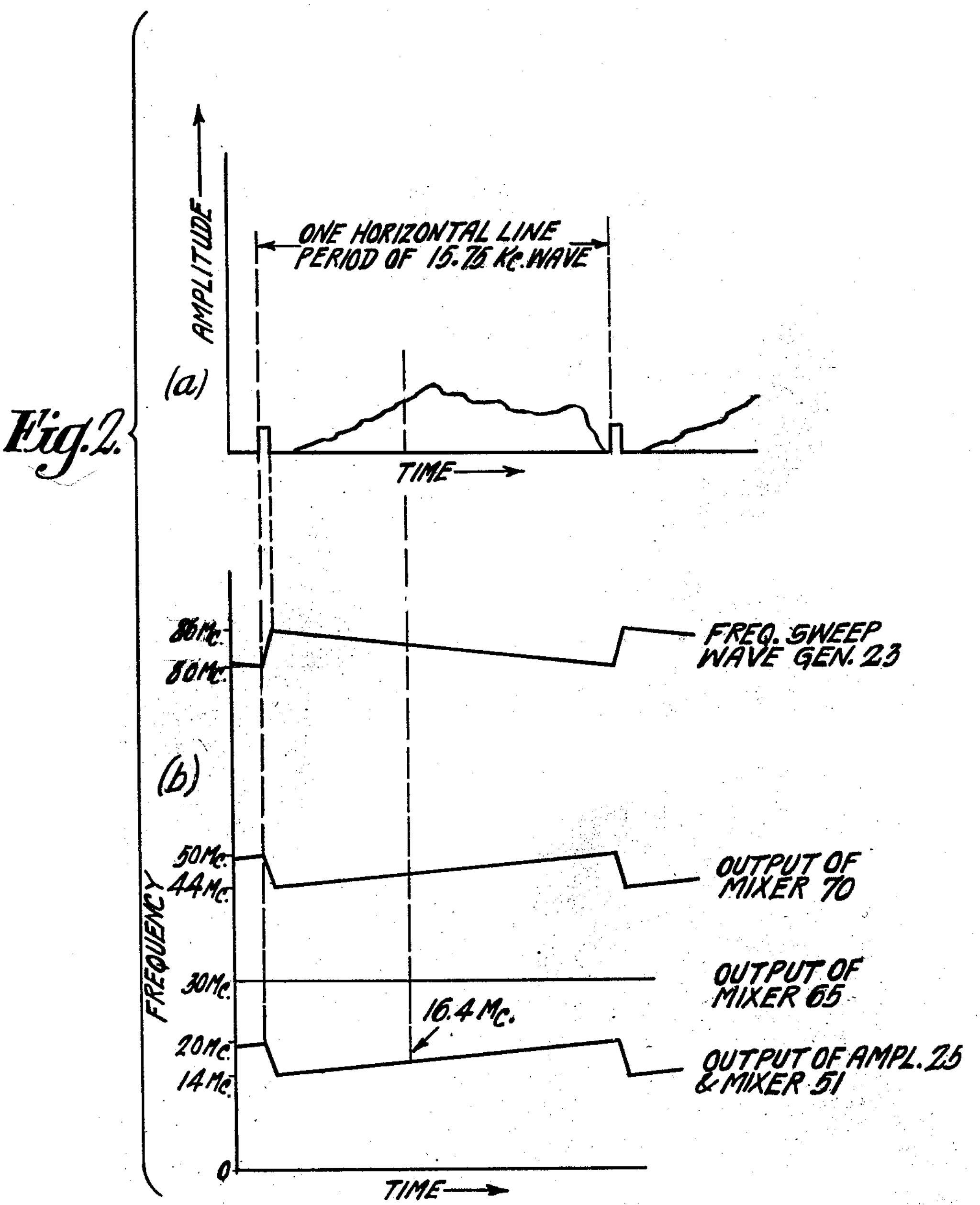

Other objects, features, aspects and advantages of the invention will, of course, become apparent and immediately suggest themselves to those skilled in the art to which the invention is directed from a reading of the following specification in connection with the accompanying drawing, wherein;

Fig. 1 is a circuit diagram of a recording and reproducing device for video signals, constructed according to the teachings of this invention; and Fig. 2 is a representation of variations in voltages and frequencies with time which will be used in explaining the operation of the circuit of Figure 1.

Curve *a* of Figure 2 represents a video signal such as a television image signal, wherein information for horizontal lines of the image are separated by synchronizing pulses. This video signal, according to television standards, may include frequency components between zero and four megacycles.

In accordance with present day television practice, a television image is produced by a moving scanning spot which traverses a viewing field to create or produce a visual image. In accordance with present day television methods, a viewing field is scanned a plurality of times, twice for example, to produce interlaced frames. Complete television images are produced under current standards at a frame frequency at 30 per second and where multiple scanning is employed, for example, duplicate interlaced scanning, the scanning of each field occurs at twice this frequency. In the interlaced scanning system of television image transmission and reproduction, each complete excursion of the scanning means in either the video signal generator or the image producing device is ordinarily referred to as a "field" and two of these fields make up an image "frame." By way of example, and in accordance with present practice, the period of the initiating pulses for each field is 1/60 of a second, nominally, which is the time required to scan one field. The complete cycle for a frame, including the blanking period at the end of each of two fields, is constituted by 525 horizontal lines. This means that the image of the original subject matter is analyzed into picture elements that form a horizontal line 15,750 times in a second. Thus, each picture element in one vertical line corresponds to a maximum frequency of less than 15,750 cycles. If two successive lines were dark and light, the frequency would be only one-half of the 15,750 cycles, but if the sequence is irregular some sideband spread may be created. A frequency of 15,750 cycles can be recorded and reproduced from a magnetically sensitive web, such for example, as a magnetic paper tape, at a speed of 90 feet per minute. This relatively low speed made possible by the invention, is identical with the 35 mm. motion picture film speed. Thus, considering a parallel recording of 40 lines per inch, for example, a 10 inch wide tape running at a velocity of 90 feet per minute is capable of completely recording a 525 line double interlaced 30 frame per second image with 400 line horizontal resolution.

The video signal represented by curve *a* of Figure 2 is applied from a source of such signals to the input of a video amplifier vacuum tube 10 shown in Figure 1. The output of amplifier 10 is coupled to a modulator 12 which is also receptive to the output of an R. F. oscillator 13, which in the system being described by way of example, has a frequency of 100 megacycles. The output of modulator 12 is a 100-megacycles wave amplitude modulated with the video signal having frequency components between zero and four megacycles. The amplitude modulated wave is coupled to an input circuit 16 of a buffer amplifier vacuum tube 17, the input circuit 16 being tuned to accommodate frequencies between 96 and 104 megacycles. The output of buffer 17 is coupled through transformer 18 to a mixer circuit 19 including a diode 20 which may be a germanium diode. Mixer 19 is also receptive through a lead 22 to the output of a frequency sweep wave generator 23 which in the present example has an output, the frequency of which sweeps linearly between 86 and 80 megacycles in sawtooth fashion.

The period of frequency sweep wave generator 23 is synchronized with the portions of the input video signal representative of successive horizontal lines of the image by means of a synchronizing connection 26. This synchronization is as illustrated in curves *a* and *b* of Figure 2 of the drawings. The period of a line of the video signal and the period of the frequency sweep wave are both that of a 15,750 kilocycle wave.

The output of mixer 19 is a wave which is both amplitude and frequency modulated. This wave is applied from the mixer through a wide band coupling circuit or bandpass filter 24 tuned to accommodate currents of frequencies between 10 and 24 megacycles, to an intermediate-frequency amplifier 25. Coupling circuit 24 thus accepts the difference frequencies in the output of mixer 19 and rejects the sum frequencies.

The wave in the output of amplifier 25 consists of a carrier sweeping in frequency between 14 and 20 megacycles, which carrier is amplitude modulated by frequency components between zero and four megacycles. This wave is applied through a record-reproduce switch 27 to a plurality of resonant circuits 30 connected in series through a record-reproduce switch 32 to the positive terminal B+ of a source of unidirectional potential. Each tuned circuit 30 is inductively coupled to a second tuned circuit 31 which is connected to a detector circuit including a germanium diode 33. The diode 33 is connected through a radio frequency coil 34 to a coil 35 on a magnetic member 36 having an air gap 37. Air gap 37 of magnetic member 36 is positioned over a movable magnetic recording web 40 which is drawn from a supply reel 41 by feed roller 42 cooperating with an idler roller 43, the feed roller being driven from a gear box 44, in turn, driven by motor 45. A take-up reel 46 is also suitably connected mechanically to gear box 44. Motor 45 is of the type operating at a constant speed and is preferably a synchronous motor. The magnetic recording web 40 is preferably wide enough so that the many recording heads can be arranged in such a manner as to be operative over parallel paths or tracks running longitudinally along web 40. The manner of arranging the heads 35, 36 with relation to the recording web 40 so as to economize space and fully utilize the surface area of web 40 is clearly illustrated and described in my Patent 2,517,808 on Image Recording and Reproducing Apparatus, issued August 8, 1950.

Each of the tuned circuits 30 and 31 are constructed to accommodate currents of frequencies in a band about 15,750 cycles wide, this range being determined by the practical limitations of conventional magnetic recording equipment and, in part, by the line repetition rate of standard television signals. The central frequencies of each of the tuned circuits 30 and 31 are distributed evenly between the frequencies of 14 and 20 megacycles. The number of tuned circuits 30 and 31 which are employed is determined by the degree of horizontal resolution which is desired in the recorded image signal, the number of tuned circuits 30 and 31 being practically equal to the number of reproducible dots along a horizontal line of the image signal. For example, in the recording of commercial television image signals, a horizontal resolution of 300 dots provides an image of good quality. This requires the use of 300 tuned circuits 30, 31, detectors 33 and recording heads 35, 36. Two hundred recording units will provide an acceptable horizontal resolution and four hundred recording units will provide excellent horizontal resolution.

Tuned circuits 30, 31 are designed with inductors and capacitors having values such as to provide, according to the formula, $$Q=\frac{\text{center frequency}}{\text{band width}}=\frac{16\text{ megacycles}}{16\text{ kilocycles}}=1000$$

a Q in the order of 1000. Thus, after tuned circuits 30, 31 are energized, they will ring with a decaying amplitude which will reach zero in about the period of one cycle of a 15,750 cycle wave.

The operation of particular circuits 30, 31, which by way of example are tuned to 16.4 megacycles plus and minus 7,875 cycles, will now be described. At a time four-tenths of the way along one horizontal line of the image signal, as represented to advantage in Figure 2, the frequency of the signal from amplifier 25 applied to all circuits 30 will have a value equal to 16.4 megacycles, the value to which the particular circuits 30, 31 under discussion are tuned. The frequency components in the range of 16.4 megacycles plus and minus 7,875 cycles have amplitudes, due to the image signal modulation of the frequency-swept carrier, which when passed through non-linear device 33 result in the generation of audio-frequency components between zero and 15,750 cycles which in turn are representative of the intensity of the particular point along the horizontal line of the image. At the same point along the next successive line, the audio-frequency components may be such as to represent a different intensity. If corresponding points on successive image lines are alternately of high and low intensity, there will be a very strong 7,875 cycles frequency component. If corresponding points on successive image lines are of uniform intensity, either high or low, there will be a 15,750 cycle component which is strong or weak depending on the convention adopted as to whether a strong signal corresponds to high image intensity or vice versa. The period between corresponding points on successive lines of a standard television signal is that corresponding with a frequency of 15,750 cycles. Since each pair of tuned circuits 30, 31 has a band width of 15,750 cycles, and each recording head can record frequencies up to 15,750 cycles, the system can easily accommodate changes in intensity between corresponding points along successive lines of the image signal.

Reference will now be made to those portions of the circuit which are employed in reproducing the information recorded upon web 40 as described above. The output of frequency sweep wave generator 23 is applied through record-reproduce switch 21 and lead 50 to a mixer 51 which is also receptive via lead 52 to an output of oscillator 13. The difference frequencies in the output of mixer 51 constitute frequencies sweeping between 14 and 20 megacycles which are applied through wire 55, record-reproduce switch 56 and radio-frequency coupling capacitor 57 to the detector circuit including diode 33. When the record-reproduce switches are in the "reproduce" position, the voltage appearing across the series of tuned circuits 30 is applied through switch 27, over lead 60 to an amplifier vacuum tube 61, the output of which is coupled through transformer 62 to a grid of mixer tube 65. Mixer tube 65 is also receptive on a second grid to a frequency sweeping from 44 to 50 megacycles from mixer 70. Mixer 70 produces the 44 to 50 megacycle output as the result of being receptive over lead 71 to a 14 to 20 megacycle signal from mixer 51 and over lead 72 to the output of a 30 megacycle oscillator 73. Since the inputs to mixer tube 65 are signals sweeping between 14 and 20 megacycles and between 44 and 50 megacycles, with periods in synchronism, the difference frequencies in the output of mixer tube 65 constitute a constant-frequency carrier of 30 megacycles amplitude modulated with intelligence from circuits 30 carried on the 14 to 20 megacycle sweep carrier from amplifier 61. This output from mixer tube 65 is coupled through transformer 75 to a detector circuit 76 which generates a video signal having frequency components between zero and four megacycles, which signal is a reproduction of the video signal applied to amplifier 10 and recorded on magnetic web 40.

In the operation of the reproducing circuit, a wave sweeping in frequency between 14 and 20 megacycles is inserted through R. F. capacitor 57 to the detector circuit including diode 33. The magnetic recording web 40 is then driven past the magnetic heads 36, 37 in the same direction and at the same speed, as was used in the recording process.

Considering again the operation of particular circuits 30, 31, which by way of example are tuned to 16.4 megacycles plus and minus 7,875 cycles, magnetic variations in the corresponding track on web 40 induce voltage fluctuations in coil 35 which consist of frequencies in the range between zero and 15,750 cycles. The voltage is applied through R. F. coil 34 to diode 33 and tuned circuit 31. Capacitor 57 is an open circuit to frequencies between zero and 15,750 cycles. At the time four-tenths of the way along the period of the 14 to 20 megacycle sweep signal, a 16.4 megacycle signal is applied through R. F. capacitor 57 through diode 33 to circuit 31 tuned to 16.4 megacycles plus and minus 7,875 cycles. At this moment, circuit 31 and its associated tuned circuit 30 ring with frequency components in the range between 16.4 megacycles plus and minus 7,875 cycles, the relative amplitudes of the various frequency components being such as to reflect the intelligence picked up from the recording web 40 in the form of voltage variations at frequencies between zero and 15,750 cycles. The fluctuations in all the series tuned circuits 30 are combined and applied over lead 60 to I. F. amplifier tube 61. The translations performed by mixer tube 65 and detector circuit 76, already described, result in the reproduction at the output of detector circuit 76 of the video signal which was previously applied to amplifier tube 10 and recorded on magnetic web 40.

It will be understood by those skilled in the art that recording heads 35 and 36 and web 40 may be replaced in the circuit by other means such as, for example, a plurality of transmission lines for the purpose of transmitting a wide-band video signal over a plurality of narrow-band lines. The video signal is then recreated at the remote end of the lines by means such as those which have been shown and described for reproducing the signal from magnetic heads 35, 36. In other words, that portion of the circuit shown which is exclusive of the magnetic heads and recording web is useful as a signal translating apparatus for purposes other than the recording and reproducing of image signals.

It will also be understood that the invention is applicable to the recording of signals other than television image signals. The invention is especially useful for the recording and reproducing of signals having definite cycles of intelligence separated by synchronizing pulses, an inherent characteristic of television and radar signals. The synchronizing pulses are used to control the frequency sweep generator 23. If the invention is applied to the recording and reproducing of a signal wherein the intelligence is continuous in time, an arbitrary synchronizing pulse would have to be inserted into the system and the intelligence coinciding in time with the arbitrarily inserted synchronizing pulses would be lost in the recording and reproducing process.

What is claimed is:

1. Translating means for a plurality of signals comprising a source of a carrier varying in frequency in sawtooth fashion, a plurality of mixers each receptive to said carrier and one of said signals, a plurality of selective circuits tuned to different frequencies distributed between the extreme frequencies of said carrier, each of said selective circuits being coupled to one of said mixers, a source of a second carrier varying in frequency so that the sum of the frequencies of both carriers is a constant, and other mixer receptive to said second carrier and the signals in said selective circuits, whereby the output of said last-named mixer is an amplitude-modulated fixed-frequency carrier.

2. Means for translating a plurality of narrow-band signals into a wide-band signal, comprising a plurality of mixers each receptive to one of said narrow-band signals, a source of a carrier varying in frequency as a substantially linear function of time and means for applying said carrier to said plurality of mixers, a plurality of selective circuits tuned to different frequencies distributed in the range of frequencies of said carrier, each one of said selective circuits being coupled to one of said mixers, a source of a second carrier varying in frequency so that the sum of the frequencies of both carriers is a constant, a mixer receptive to said second carrier and the signals in said selective circuits, and a demodulator receptive to the output of said mixer.

3. Means for translating a plurality of narrow-band signals into a wide-band signal, comprising a source of a carrier varying in frequency in sawtooth fashion, a plurality of mixers each receptive to said carrier and one of said narrow-band signals, a plurality of selective circuits tuned to different frequencies distributed between the extreme frequencies of said carrier, each of said selective circuits being coupled to one of said mixers, a source of a second carrier varying in frequency so that the sum of the frequencies of both carriers is a constant, another mixer receptive to said second carrier and the signals in said selective circuits, and a demodulator receptive to the output of said mixer.

4. A magnetic recording device for image signals representative of successive lines of an image, comprising means for amplitude modulating a carrier with the image signal, the carrier being one sweeping in frequency with a period corresponding with a line of the image signal, a movable recording web, and a plurality of frequency-selective detecting and recording means receptive to said modulated carrier and magnetically operative on parallel tracks on said web.

5. A magnetic recording device for a signal of the type having cycles of intelligence separated by synchronizing pulses, comprising means for amplitude modulating a carrier with said signal, the carrier being one sweeping in frequency in sawtooth fashion with a period corresponding with the cycles of intelligence of said signal, a movable recording web, and a plurality of frequency-selective detecting and recording means receptive to said modulated carrier and magnetically operative on parallel tracks on said web.

6. A magnetic recording device for image signals representative of successive lines of an image, comprising a source of a carrier sweeping in frequency with a period corresponding with a line of said image signal, modulating means for amplitude modulating said carrier with the image signal, a plurality of selective circuits coupled to the output of said modulating means, the selective circuits being tuned to center frequencies distributed between the extreme frequencies of said frequency sweep wave generator, a movable magnetic recording web, and a plurality of recording devices positioned to record on parallel tracks on said web, each recording device being operatively connected to one of said selective circuits.

7. A magnetic recording device for video television image signals wherein portions representative of successive lines of an image are separated by synchronizing pulses, comprising a fixed frequency oscillator, a modulator having one input receptive to said video signal and having another input receptive to the output of said oscillator, whereby said modulator provides a carrier wave which is amplitude modulated by said video signal, a frequency sweep generator, means locking the period of said sweep generator with the synchronizing pulses of said video signal, a mixer having one input coupled to the output of said frequency sweep generator and having another input coupled to the output of said modulator, whereby the output of said mixer is a frequency sweeping wave amplitude modulated with said video signal, a plurality of selective circuits coupled to the output of said mixer, the selective circuits being tuned to center frequencies distributed between the extreme frequencies of said frequency sweep wave generator, a movable magnetic recording web, and a plurality of recording devices positioned to record on parallel tracks on said web, each recording device being operatively connected to one of said selective circuits.

8. A magnetic recording device for image signals representative of successive lines of an image, comprising a source of a carrier sweeping in frequency with a period corresponding with a line of said image signal, modulating means for amplitude modulating said carrier with the image signal, a plurality of selective circuits coupled to the output of said modulating means, the selective circuits being tuned to center frequencies distributed between the extreme frequencies of said carrier, a plurality of detectors, one coupled to each of said selective circuits, a movable magnetic recording web, and a plurality of recording devices positioned to record on parallel tracks on said web, each recording device being operatively connected to one of said detectors.

9. A recording and reproducing arrangement for image signals representative of successive lines of an image, comprising a recording system including a source of a carrier sweeping in frequency with a period corresponding with a line of said image signal, a modulator for amplitude modulating said carrier with the image signal, a plurality of frequency-selective circuits coupled to the output of said modulator, the selective circuits being tuned to center frequencies distributed between the extreme frequencies of said carrier, a plurality of detectors, one coupled to each of said selective circuits, a movable magnetic recording web, a plurality of recording devices positioned to be operative on parallel tracks on said web, each recording device being connected to one of said detectors, whereby the image signal may be recorded on said web, a reproducing system including means for applying said carrier to said plurality of detectors, a second source of a carrier sweeping through frequencies such that the sum or difference of the frequencies of the carriers is a constant, a mixer receptive to said second carrier and the amplitude modulated frequency sweep carrier in all said selective circuits, and a detector receptive to the output of said mixer, whereby the output of said detector is a reproduction of the image signal previously recorded upon said web, said recording and reproducing arrangement including switch means for alternately connecting common elements into said recording system and said reproducing system.

10. A magnetic recording and reproducing arrangement for image signals representative of successive lines of an image, comprising a recording system including a source of a carrier sweeping in frequency with a period corresponding with a line of said image signal, modulating means for amplitude modulating said carrier with the image signal, a plurality of selective circuits coupled to the output of said modulating means, the selective circuits being tuned to center frequencies distributed between the extreme frequencies of said carrier, a plurality of detectors, each detector being coupled to a respective one of said selective circuits, a movable magnetic recording web, a plurality of recording devices positioned to record on parallel tracks on said web, each recording device being operatively connected to one of said detectors, whereby the image signal may be recorded on said web, a reproducing system including means for applying said sweeping carrier to said detectors, a second source of a carrier sweeping thru frequencies such that the sum or difference of the frequencies of the carriers is a constant frequency, a mixer receptive to said second carrier and the signal in all of said selective circuits, and a detector receptive to the output of said mixer, whereby the output of said detector is a reproduction of the signal with which the first carrier was previously modulated, said recording and reproducing arrangement including switch means for alternately connecting common elements into said recording system and said reproducing system.

11. Means for translating a wide band signal into a plurality of narrow band signals, comprising, a fixed frequency oscillator, a modulator having an input coupled to the output of said oscillator and having another input receptive to said wide band signal, a frequency sweep wave generator, a mixer having one input coupled to the output of said modulator and having another input coupled to the output of said sweep generator, a bandpass filter coupled to the output of said mixer to pass one side band therefrom, a plurality of frequency selective circuits all coupled to the output of said band pass filter, and a plurality of demodulators each coupled to a respective one of said frequency selective circuits, whereby a plurality of narrow band signals are provided by said demodulators.

12. Means for translating a video television signal including equally spaced synchronizing pulses into a plurality of narrow band signals, comprising, a fixed frequency oscillator, a modulator having an input coupled to the output of said oscillator and having another input receptive to said video signal, a sawtooth frequency sweep wave generator, means to apply said video signal to said sweep generator to synchronize the operation thereof with said synchronizing pulses, a mixer having one input coupled to the output of said modulator and having another input coupled to the output of said sweep generator, a bandpass filter coupled to the output of said mixer to pass one side band therefrom, a plurality of frequency selective circuits all coupled to the output of said bandpass filter, the selective circuits being tuned to different frequencies distributed in the range of frequencies of said sweep generator, and a plurality of demodulators each coupled to a respective one of said frequency selective circuits, whereby a plurality of narrow band signals are provided by said demodulators.

References Cited in the file of this patent

UNITED STATES PATENTS

| | | |
|---|---|---|
| 1,830,896 | Wintringham | Nov. 10, 1931 |
| 1,994,232 | Schuck | Mar. 12, 1935 |
| 2,181,265 | Dudley | Nov. 28, 1939 |
| 2,213,246 | Heller | Sept. 3, 1940 |
| 2,465,355 | Cook | Mar. 29, 1949 |
| 2,517,808 | Sziklai | Aug. 8, 1950 |
| 2,530,693 | Green | Nov. 21, 1950 |
| 2,532,731 | Potter | Dec. 5, 1950 |
| 2,632,036 | Hurwitz | Mar. 17, 1953 |
| 2,698,875 | Greenwood | Jan. 5, 1955 |